US012434862B2

(12) United States Patent
Judd et al.

(10) Patent No.: US 12,434,862 B2
(45) Date of Patent: Oct. 7, 2025

(54) ELECTRIC ION PROPULSOR

(71) Applicants:Mano D Judd, Heath, TX (US); Gilmary M Hostage, III, Boerne, TX (US); Marinus Bernard Bosma, Tipp City, OH (US)

(72) Inventors: Mano D Judd, Heath, TX (US); Gilmary M Hostage, III, Boerne, TX (US); Marinus Bernard Bosma, Tipp City, OH (US)

( * ) Notice: Subject to any disclaimer, the term of this patent is extended or adjusted under 35 U.S.C. 154(b) by 0 days.

(21) Appl. No.: 18/578,901

(22) PCT Filed: Mar. 8, 2022

(86) PCT No.: PCT/US2022/019210
§ 371 (c)(1),
(2) Date: Jan. 12, 2024

(87) PCT Pub. No.: WO2023/172244
PCT Pub. Date: Sep. 14, 2023

(65) Prior Publication Data
US 2024/0417110 A1    Dec. 19, 2024

(51) Int. Cl.
*B64G 1/40* (2006.01)
*F03H 1/00* (2006.01)
(52) U.S. Cl.
CPC ............ *B64G 1/413* (2023.08); *F03H 1/0075* (2013.01)

(58) Field of Classification Search
CPC ........ B64G 1/402; B64G 1/405; B64G 1/413; F03H 1/0075
See application file for complete search history.

(56) References Cited

U.S. PATENT DOCUMENTS

| 11,231,023 | B2 * | 1/2022 | Siddiqui | ................ B64G 1/402 |
| 11,575,204 | B1 * | 2/2023 | Veysoglu | ................ H01Q 3/34 |
| 2019/0107103 | A1 * | 4/2019 | Siddiqui | ............... F03H 1/0093 |

* cited by examiner

*Primary Examiner* — Lorne E Meade
(74) *Attorney, Agent, or Firm* — Cynthia S. Lamon; Lamon Patent Services

(57) ABSTRACT

An electric ion propulsor and method of using is provided comprising a substrate having an inner surface and outer surface. A plurality of antennae mounted adjacent to each other on the inner surface and are enabled to transmit RF energy, and a controller having a connection to each of the plurality of antennae, a digital signal processor (DSP) and software stored in memory enabling control of transmission of the RF energy by each of the plurality of antennae. The antennae are subdivided into a plurality of arrays, a first array of the plurality of arrays serves to ionize ambient air and trap the resulting ionized air into a plurality of individual voxels and each voxel is transferred to another adjacent array, subsequently and in a linear direction, until the voxel exits the substrate at a speed enabling air movement causing thrust.

14 Claims, 17 Drawing Sheets

ELECTRIC ION PROPULSOR

CROSS-REFERENCE TO RELATED APPLICATIONS

The present application claims priority to and is a National Entry from PCT/US2022/019210, filed Mar. 8, 2022.

BACKGROUND OF THE INVENTION

1. Field of the Invention

The present invention is in the technical area of propulsion, relates to a type of ionic engine and more particularly, to an aircraft engine. This invention also relates to a method and apparatus for manipulating a gaseous media using near field wave mechanics to create mechanical forces efficiently from near field radio frequency waves.

2. Description of Related Art

Conventional Earth-Gravity propulsion systems, such as jet engines as well as propeller driven aircraft, all require substantial liquid fuel, such as kerosene, gasoline or jet fuel. Furthermore, these systems all use many moving parts and thus require extensive and expensive maintenance and repair, on a yearly basis.

There are many different propulsion or propulsor technologies that are not based on conventional combustion nor requiring liquid fuel such as kerosene, or gasoline. These include electromagnetic, electrostatic, ionic, and other non-combustion type technologies currently in use or development. Many of these technologies have much greater efficiency, in terms of input power (kW) to thrust (Newtons), than conventional combustion engines. However, a key problem with the non-combustion type technologies is that energy density, which is the amount of power that can be delivered per unit weight for a meaningful travel range, is still lacking. One liter of Kerosene generates 43 MJ of energy per kg. However, a Lithium-Ion battery only stores approximately 0.4 to 0.9 MJ per kg, a difference of approximately 72 times. Additionally, many of these electric propulsors lack the required thrust for practical use in an Earth-Gravity ambient air environment.

Ion thrusters, and different electrostatic methods, require approximately 25 kW of power per Newton of thrust. For example, the NASA Evolutionary Xenon Thruster (NEXT) produced 0.236 Newtons of thrust using 6.9 kW of input power, for an efficiency of approximately 29 kW per Newton of thrust in deep space. However, for small satellites, typical Solar Power generation is often limited to less than 10 kW, thus limiting thrust to less than 0.4 Newtons. While useful for spacecraft propulsion, these systems do not generate enough thrust required for airborne flight, within Earth's atmosphere.

Ionic wind is a novel, new technology-showing potential to create efficient thrust in Earth gravity with no moving parts. This technology has demonstrated 5 Newtons of thrust per kilowatt, or approximately 9 Watts per Newton, which is far higher efficiency than ionic thrusters. Compared to the 500 Watts per Newton requirement, for the jet engine, the ionic wind technology seems to be a far more efficient alternative. However, problems of fuel energy density are still significant. What is needed in the art is an ionic or electromagnetic propulsor solution, with approximately ten times the efficiency, as the current ionic wind technology.

The ionic wind model would be yet much higher in efficiency if the ionization efficiency of the system were greatly improved. For ionic wind, the same system that provides the acceleration of ions also provides the ionization of air molecules. The ionization ratio for nearby air molecules is quite low. What is needed is a means that provides for a much higher ionization rate. Additionally, it would be beneficial to not require two separate systems, one which ionizes the air molecules and then another system to accelerate the air molecules. That is, a single system that can both ionize a very high density of air molecules and accelerate the air molecules to high speeds, for high output thrust.

Most current and past ionic technologies, with high efficiencies, are based solely on electrostatics. That is, zero frequency direct current (DC) electric fields. This (zero frequency) technology therefore does not lend itself to achieving spatial summing (constructive interference or destructive interference), nor any particular and/or accurate control of fields in space. This can be easily observed from Van der Graph generators and Tesla Coils, where their (breakdown field) arcs are extremely random in occurrence and location. This manifests when one observes the ragged construct of a lightning bolt or the branching of bolts in these discharges.

NFWM technology is based on generation of extremely high-power RF electric fields, and the ability to accurately project and control these fields to exact and specific locations in space. Unlike electrostatics, enormous field strength values can be generated creating ion bundles from multiple low power RF antenna emitters, via constructive interference. Desired regions in Earth space for example containment walls can also be set to near zero voltage, via destructive interference. This method can be used to create spinning rotors, impellers and propellers, made of plasma, with rotation velocities and linear velocities near the velocity of light. Finally, the RF based NFWM technology, can be integrated with electrostatic solutions, to counter their vulnerabilities, and finally enable sufficient ion densities and ion placement (at the propulsor entrance) to generate a very high thrust air atmosphere ionic engine.

It would be advantageous to provide a propulsor that can move air through it such as in a jet propulsor without the complexity, cost and inefficiency of a fuel burning jet.

It would be advantageous to provide a propulsor that can move air around it such as in a jet engine without the complexity, cost and inefficiency of a burning fuel.

It would also be advantageous to provide a machine that can translate air without any moving parts.

It would further be advantageous to provide an apparatus that can translate a plasma through an duct to convey air at speeds and volumes sufficient to provide thrust.

It would further be advantageous to provide an apparatus that can impound a plasma in an enclosed space.

It would further be advantageous to provide an apparatus that can translate a plasma over a surface to convey air at speeds and volumes sufficient to provide thrust.

It would further be advantageous to provide an apparatus that can translate a plasma through free space to convey air at speeds and volumes sufficient to provide thrust.

It would further be advantageous to provide an apparatus that can translate a plasma in a closed space.

It would further be advantageous to provide an apparatus that can translate a plasma through a duct to convey air at speeds and volumes sufficient to provide thrust without imperiling mechanical components such as turbomachinery with ice. Such an apparatus would create thrust.

It would further be advantageous to provide an apparatus that can translate a plasma through an enclosed space to convey ionized matter at speeds and volumes sufficient to provide thrust without reflecting radar signals from turbomachinery or other mechanical bodies inside of the engine.

It would further be advantageous to provide an apparatus that can translate a plasma through an enclosed space to convey air at speeds and volumes sufficient to provide thrust to a projectile such as is in a rail gun.

It would further be advantageous to provide an apparatus that can translate a plasma through an enclosed space to rotate air at speeds and volumes sufficient to move a coupled body.

It would further be advantageous to provide an apparatus that can translate a plasma through an open space to pressurized air.

It would further be advantageous to provide an apparatus that can translate a plasma through an open space to pressurized air to levitate bodies against attractive forces such as for example gravity.

BRIEF SUMMARY OF THE INVENTION

In one embodiment of the present invention an aircraft is powered by an engine comprising a cylindrical containment, populated with antennae whose emissions are coordinated in a way that ionizes air at the inlet, sequesters the ions in coherent bundles via the same antennae, arrays these bundles so they form structures dominated by these ions which are then conveyed to create force indistinguishable from that created by a jet engine.

In one embodiment of the present invention a surface is tiled with antennae whose emissions are coordinated in a way that ionizes air, sequesters the ions in coherent bundles via the same antennae, arrays these bundles so they form structures dominated by ions which are then conveyed to create flow indistinguishable from that created by an aircraft in flight. This flow is not inherited but created to provide a force tangential to the surface enabling reaction forces.

In one embodiment of the present invention a surface is tiled with antennae whose emissions are coordinated in a way that ionizes air, sequesters the ions in coherent bundles via the same antennae, arrays these bundles so they form structures dominated by these ions which are then compacted to form a pressurized volume which can be, for example, used to float a body above an impermeable surface such as for example the ground. This pressurized and wholly contained volume can maintain static levitation or by conveying the ion bundles as described in the paragraph above move the levitated body in any direction, pitch the body in to any angle and translate the body in any direction.

DETAILED DESCRIPTION OF THE INVENTION

Figure 1:
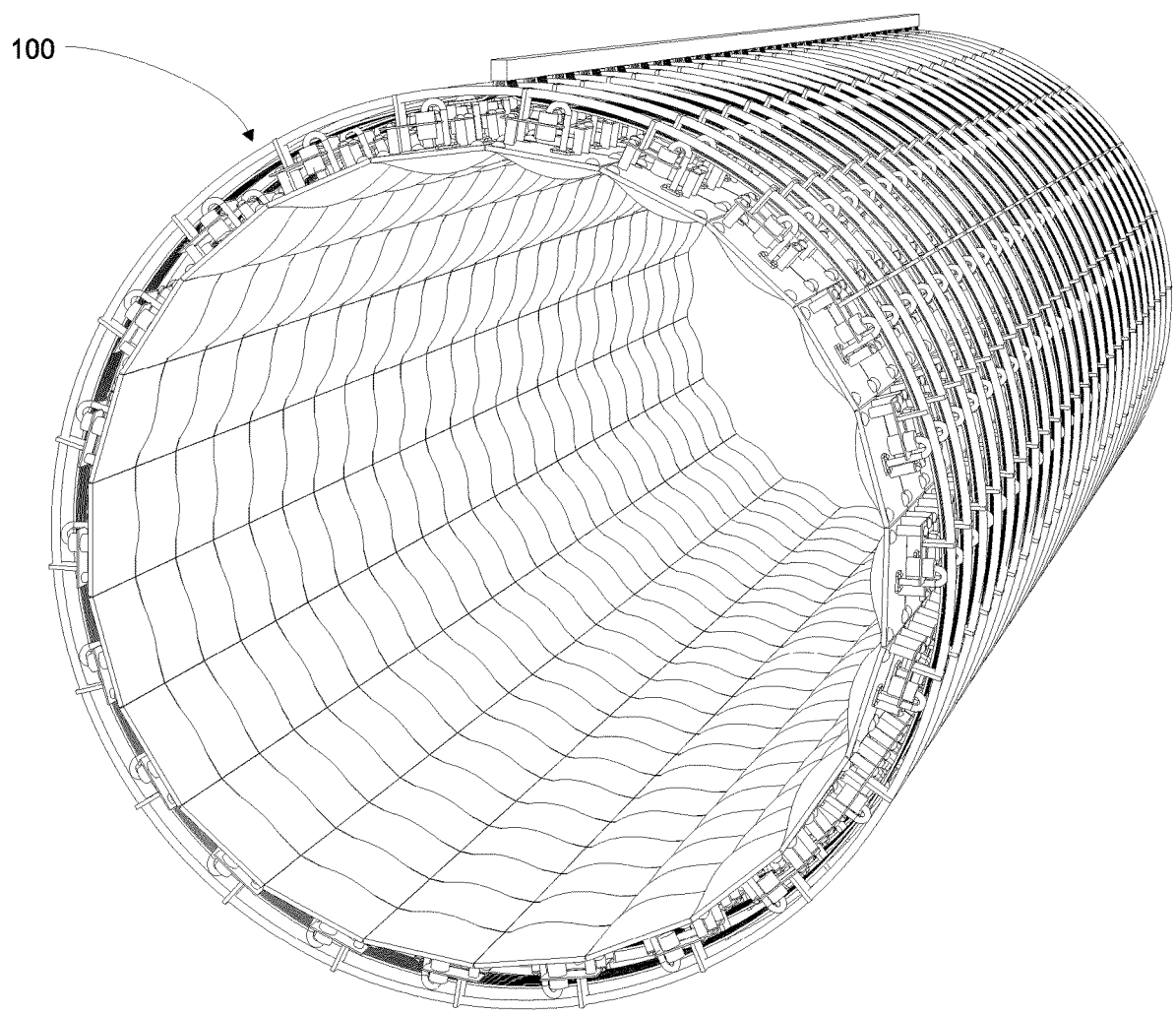
FIG. 1 is a perspective view of a cylindrical electric ion propulsor with antennae arrayed on an inside surface.

For purposes of clarity and brevity, like elements and components will bear the same designations and numbering throughout the Figures.

It is intended that the terminology used in the description presented below be interpreted in its broadest reasonable manner, even though it is being used in conjunction with a detailed description of certain examples of the technology. Although certain terms may be emphasized below, any terminology intended to be interpreted in a restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "coupled," or any variant thereof means any coupling, either direct or indirect between two or more elements; a coupling between the elements can be physical, logical, or a combination thereof. Additionally, the words, "herein," "above," "below," and words of similar import, when used in this application, shall refer to this application as a whole and not to portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list. References may be made herein to modules, routines, and subroutines; generally, a module or routine is a software program executed by computer hardware and that a subroutine is a software program executed within a module or routine. However, modules or routine discussed herein may be executed within another module or routine and submodules or subroutines may be executed independently (modules or routines may be submodules or subroutines and vice versa).

As used herein, "releasable," "connect," "connected," "connectable," "disconnect," "disconnected," and "disconnectable" refers to two or more structures which may be connected or disconnected, generally without the use of tools (examples of tools including screwdrivers, pliers, wrenches, drills, saws, welding machines, torches, irons, and other heat sources) and generally in a repeatable manner. As used herein, "attach," "attached," or "attachable" refers to two or more structures or components which are attached using tools or chemical or physical bonding. As used herein, "secure," "secured," or "securable" refers to two or more structures or components which are either connected or attached.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Since other modifications and changes varied to fit operating requirements and environments will be apparent to those skilled in the art, the invention is not considered limited to the example chosen for purposes of disclosure and covers all changes and modifications which do not constitute departures from the true spirit and scope of this invention.

Herein is described a propulsor that uses near field wave mechanics (NFWM), which can generate powerful RF fields, within a volume determined by the user, and position these fields at will both in an enclosed space and in free space. Additionally, this technology allows the shaping of field regions to further exploit the ionization, capture, and acceleration of ions. The result will be an atmosphere ionic propulsor with thrust many times greater than conventional turbofan engines, using no (liquid) fuel and no moving parts.

In accordance with the present invention, there is provided a means of generating Near Field Wave Mechanics which can generate immensely powerful RF fields, within a confined tube or cylinder, and position these fields at will. Additionally, this technology allows the shaping of field regions to further exploit the ionization, capture, and acceleration of ions. The resultant will be an air atmosphere ionic propulsor with thrust many times greater than conventional Turbofan Engines, using no [liquid] fuel and no moving parts.

FIG. 1 is a perspective view of an ionic propulsor 100, having a general shape of a cylinder whose dimensions in this embodiment are like that of a conventional jet engine in length and diameter.

Figure 2:
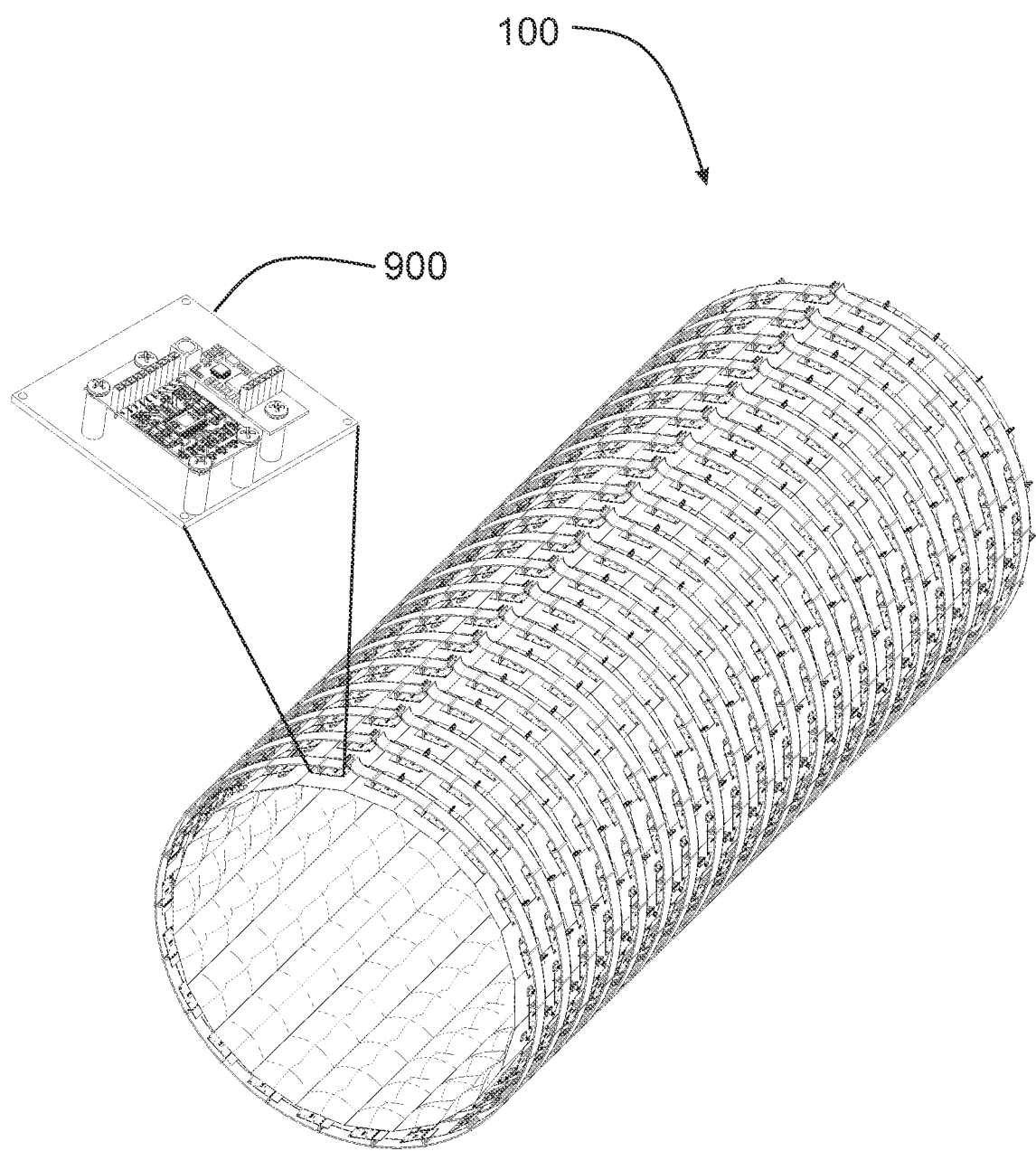
FIG. 2 is an isometric view of an electric ion propulsor 100 having a cylindrical shape with a magnified view of an individual antenna module 900.

FIG. 2 is an isometric view of an ionic propulsor 100 which may have a general shape of a cylinder with dimensions, in this embodiment, like that of a conventional jet engine in length and diameter and showing a broken out and detailed view of an antenna module 900. In this embodiment of the ionic propulsor 100 acts as an engine drawing air in this example through its cylindrical interior from one end to the other. The antennae 900 are arranged so that their emissions are pointed towards and normal (perpendicular) to the axis of the cylinder and the cylinder is formed by the antennae 900.

Figure 3:
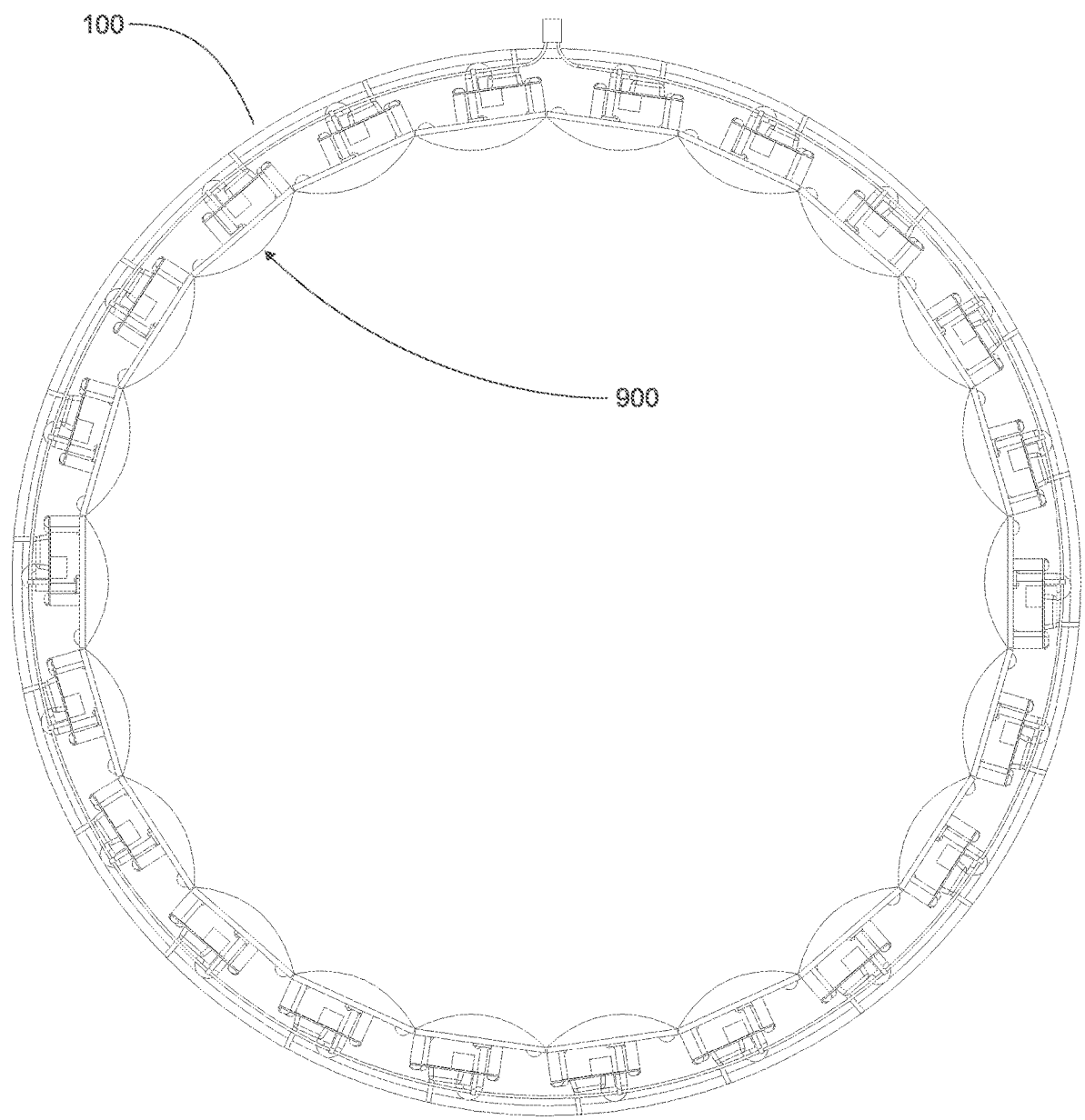
FIG. 3 is a front elevation view of a cylindrical electric ion propulsor 100 with individual antenna modules 900 arranged on the inside of the cylinder.

FIG. 3 is an end view of an ionic propulsor 100 the general shape of which is a cylinder whose dimensions in this embodiment are like that of a conventional jet engine in length and diameter and showing the location of a single antenna module 900 of which a multitude of them are arranged in a circular arrangement and whose emissions are directed towards the axis of the cylindrical shape. In this view that axis is at the center of the cylindrical shape of the propulsor 100.

Figure 4:
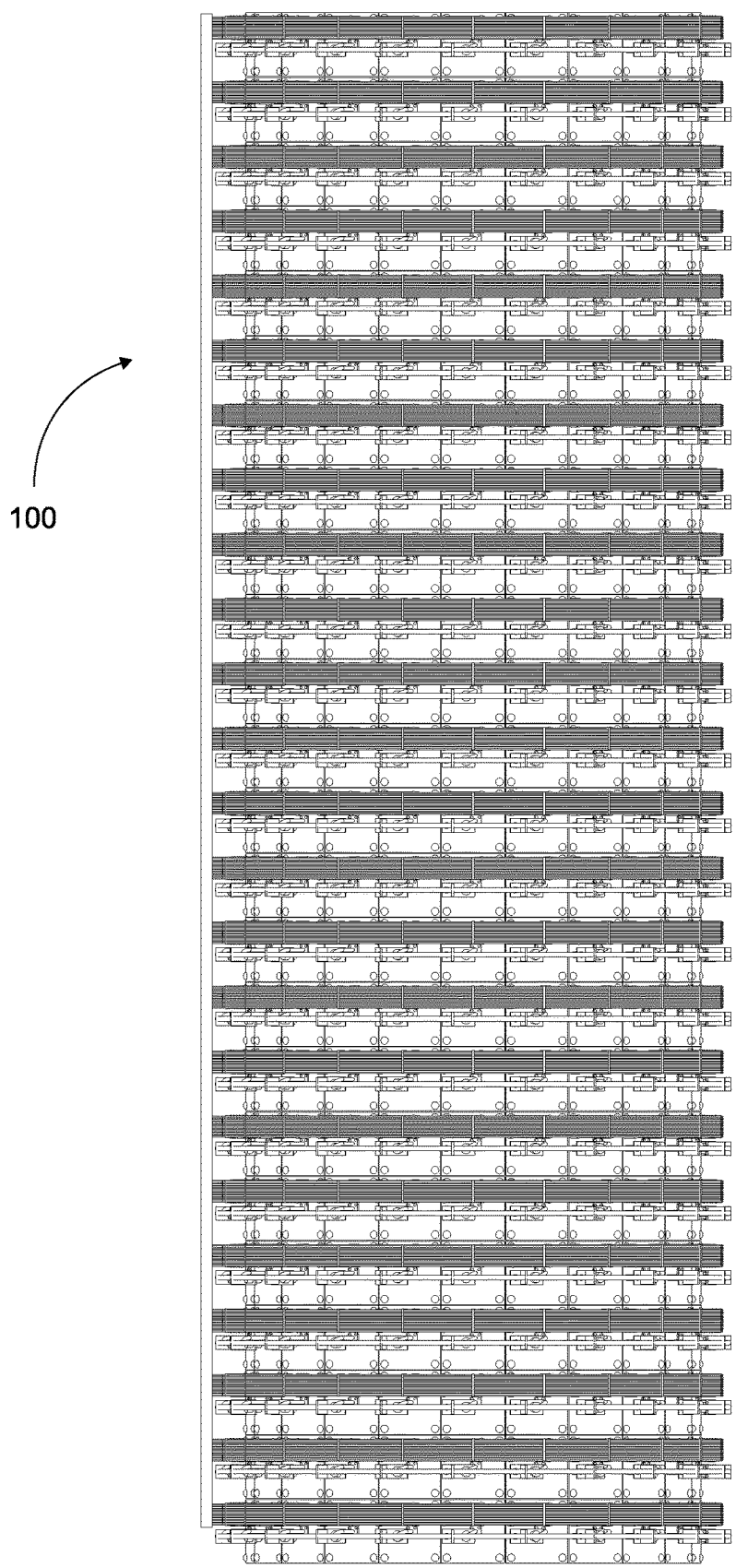
FIG. 4 is a side elevation view of a cylindrical electric ion engine.

FIG. 4 is a side view of an ionic propulsor 100 the general shape of which is a cylinder whose dimensions in this embodiment are like that of a conventional jet engine in length and diameter.

Figure 5:
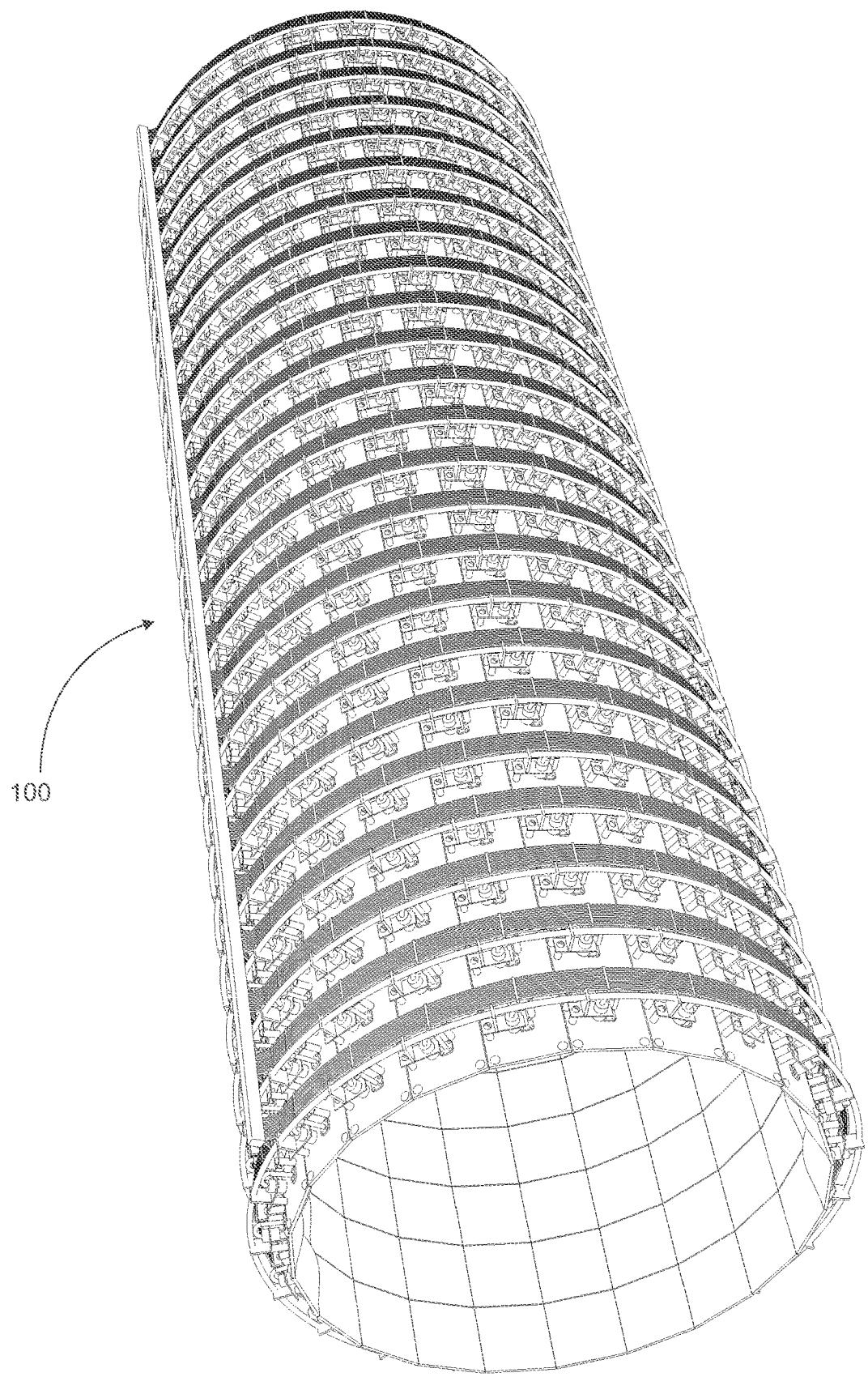
FIG. 5 is a perspective view of a cylindrical electric ion engine.

FIG. 5 is a trimetric view of an ionic propulsor 100 the general shape of which is a cylinder whose dimensions in this embodiment are like that of a commercial jet engine in length and diameter.

Figure 6:
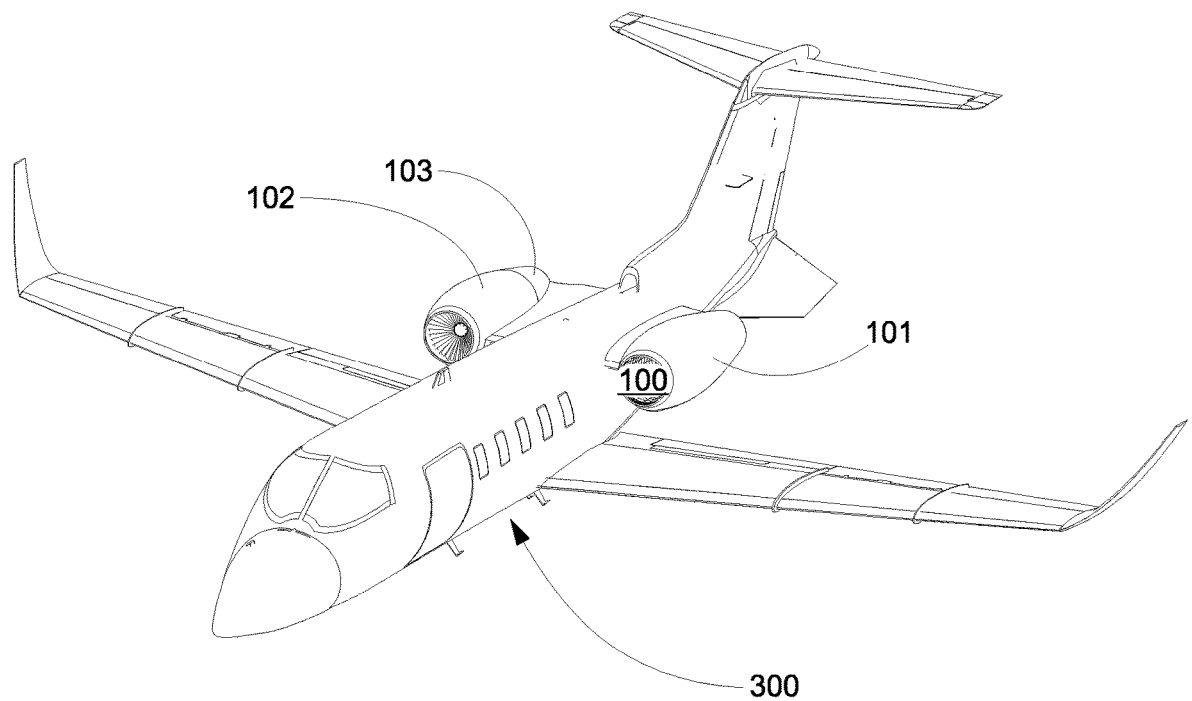
FIG. 6 is an isometric view of a jet aircraft 300 with an electric ion propulsor on the left side of the aircraft.

FIG. 6 is a perspective view of a jet aircraft 300 with a commercial jet engine 102 on the starboard side of the aft fuselage. The starboard side of an aircraft is the right side of the aircraft relative to the pilot who sits facing forward in the aircraft. The conventional engine 102 has a thrust reverser 103 which is a structure on the exhaust end of the engine 102 that directs flow to the side or in some cases reverses the flow of exhaust gases to provide a reduction in thrust from the engine 102. In some cases, the flow from the thrust reverser 103 can be strong enough to impart thrust opposite the normal direction of flow from the engine 102. This capability of the engine 102 and its thrust reverser 103 helps the aircraft slow down and in some cases, stop.

On the port side is a containment pod 101 inside of which is an ionic engine 100. Owing to the operation of the ionic engine 100 there is no need for a thrust reverser 103 because flow from this propulsor 100 can be reversed by control means. This function is further explained with FIG. 8 and FIG. 9.

Figure 7:
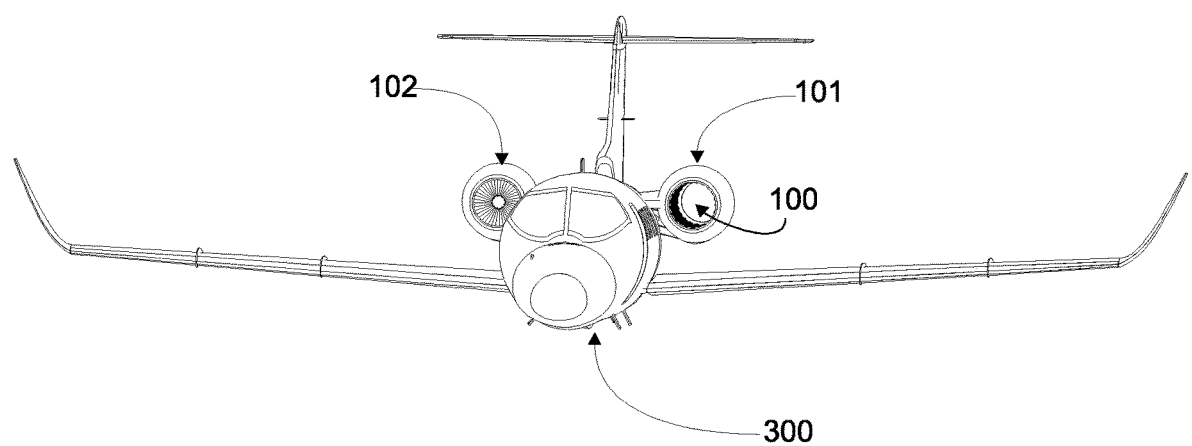
FIG. 7 is a front perspective view of a jet aircraft 300 with an electric ion propulsor 100 on the left side of the aircraft facing forward and a conventional jet engine102 on the right side.

FIG. 7 is a front view of a jet aircraft 300 with a conventional jet engine 102 on the starboard side and an electric ionic engine 100 contained in a pod 101 on the port side. The conventional jet engine 102 shows how its internal structures consisting of turbomachinery, bearings, shafts, pumps, actuators and other structure obstructing a clear flow of air through the starboard pod 102. The portside pod 101 containing the electric ionic engine 100 has no such obstructions allowing air to flow in either direction through the pod 101.

Figure 8:
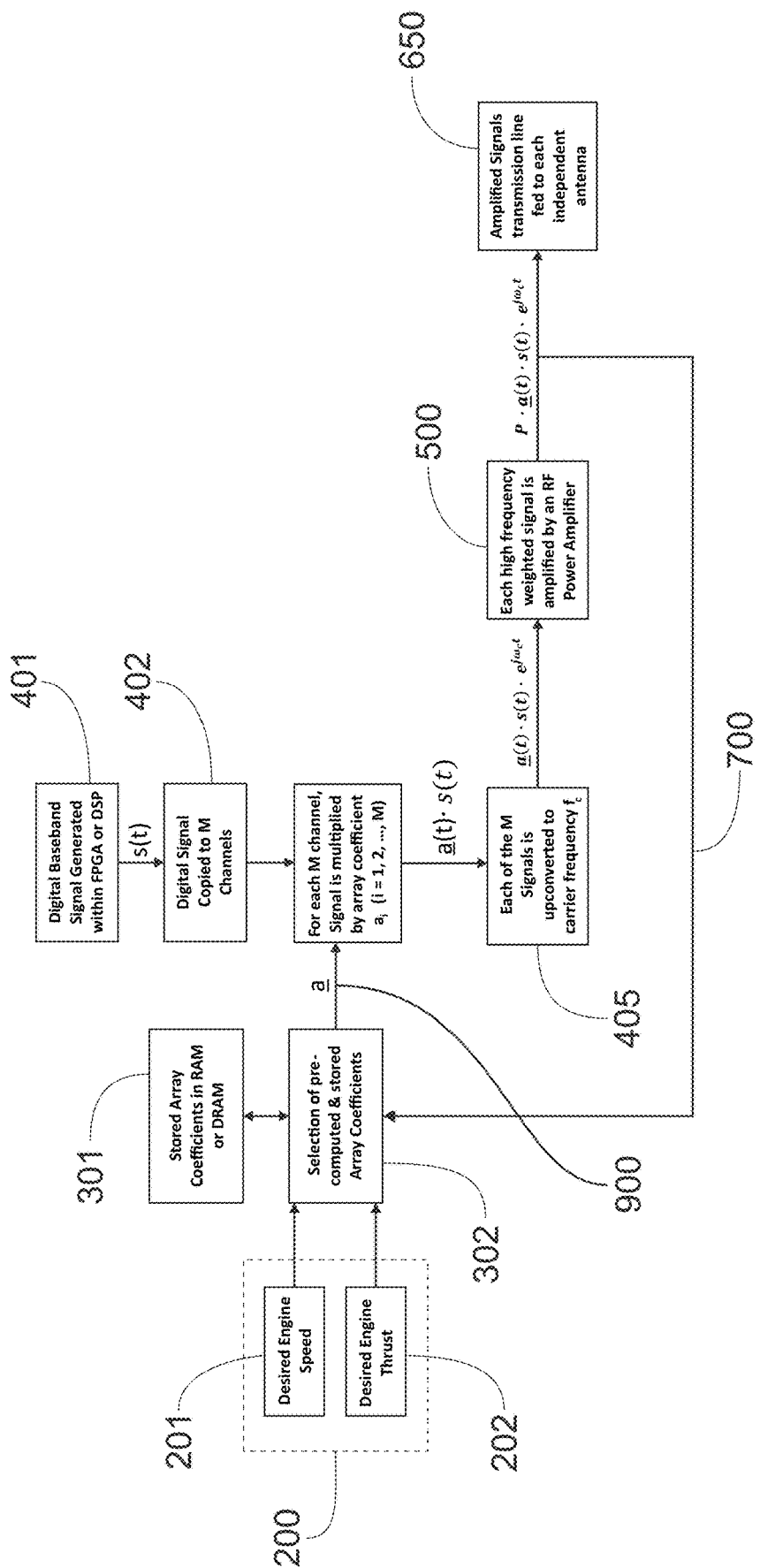
FIG. 8 is the control software flow chart for an electric ion propulsor.

FIG. 8 is a diagram of the control system for the antenna modules 900. Control begins with input 200 from an operator or other means to signal a desired outcome from the electric ionic engine 100. The two parameters for control are desired air speed 201 and thrust 202. One or both control inputs are required to supply data to the first processor 302 which, in addition to the user control inputs uses pre-stored signal data 301 stored in computer memory. These two data inputs 200 and 301 are processed with feedback data 700 from subsequent processing to create a control signal 400 for the antenna modules 900. The processing step 650 creates a multiplicity of signals that are dependent on a digital signal processing signal 401 which provides the basic digital baseband which drives a signal 402 and combines them into discrete signals for each antenna module (not shown). These signal coefficients are arrayed and delivered to an upconverter 405 which delivers the proper RF signal to the antennae via power amplifiers to the individual antenna modules 900. This process from beginning to end is enabled by extremely fast digital processing and economic data processing. There is a single control loop 700 which is used to condition the control inputs and has minimal effect on processing overhead.

Figure 9:
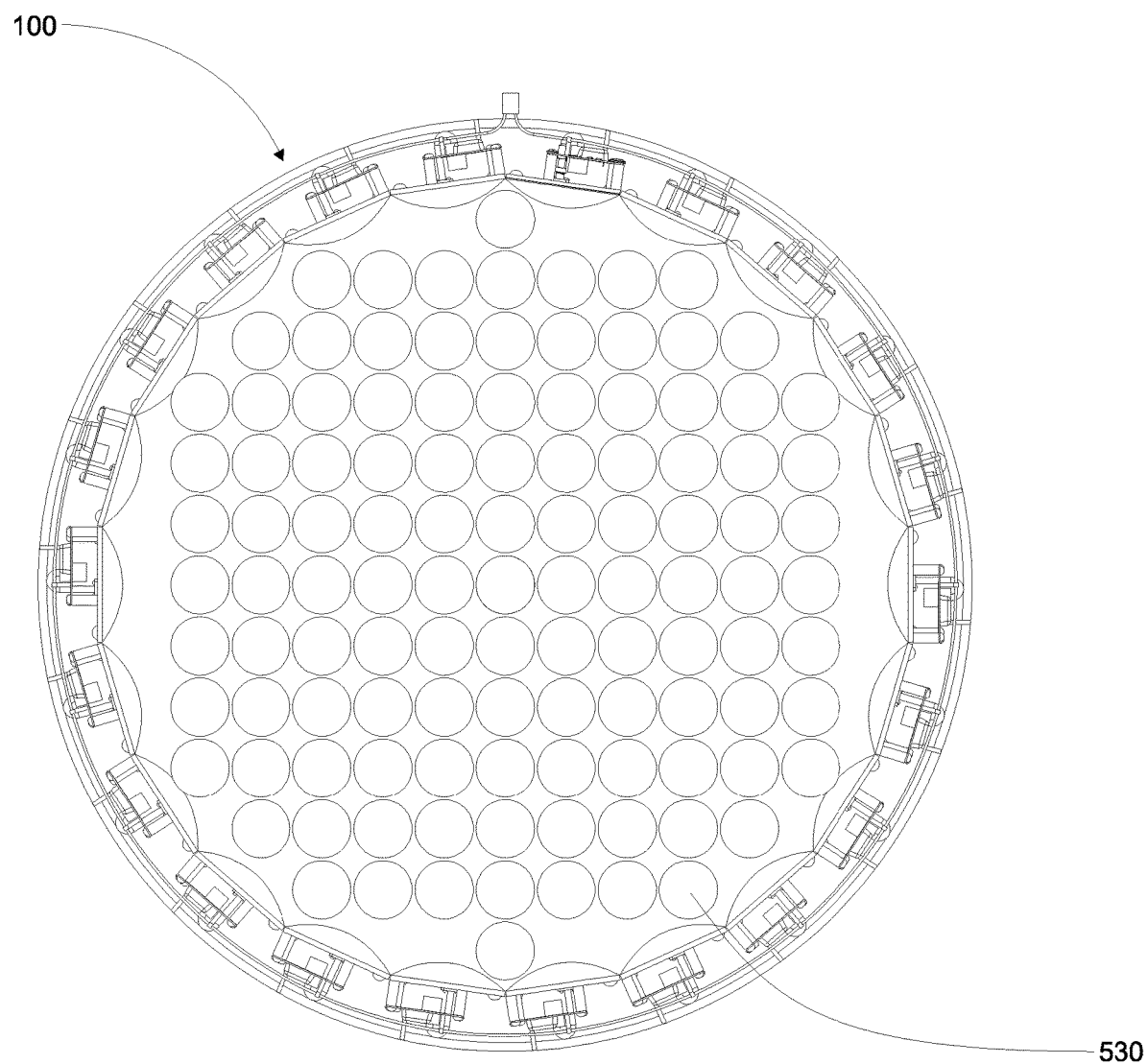
FIG. 9 is an elevated end view of the electric ion engine showing ion bundles 530.

FIG. 9 is an elevated end view of the electric ion engine showing ion bundles 530.

Figure 15:
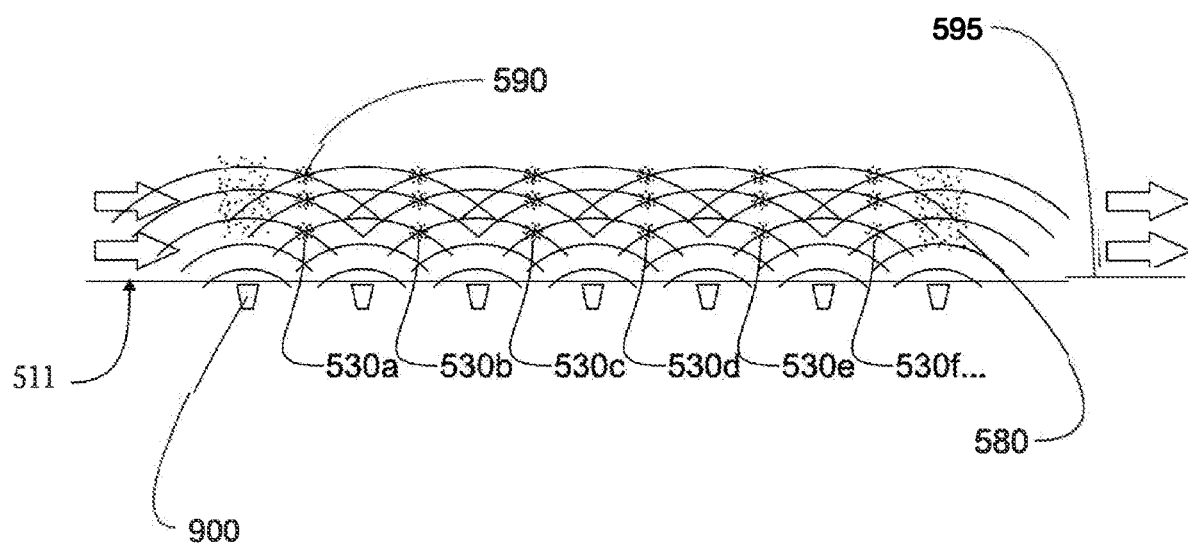
FIG. 15 shows voxels moving along a linear path.

FIG. 15 demonstrates what happens inside an electric ionic engine of this invention. This diagram is used to illustrate the flow of air through what would be a 3-dimensional apparatus and is not to scale nor representative of the actual number of elements required to create ionization, flow or thrust.

In this diagram, incoming ambient air 511 is introduced into a planar field of air molecules subjected to RF energy from antennae whose voltage approaches that of breakdown voltage. Breakdown voltage as used in this apparatus is that voltage usually expressed as kV/meter at which a specific gas becomes a plasma. In the case of nitrogen, a major constituent of the atmosphere this voltage, although extremely high (70 kV/meter), can be achieved easily. This apparatus and the methods used herein exploits this known feature of the atmosphere to generate useful ion bundles 530a-530f.

By using RF fields to deliver these voltages to the incoming air mass the ionized gas molecules can be impounded into bundles 530 volumetrically organized into prismatic or more complex structures and controlled. This orderly structure of bundles 530a-530f can be thought of as voxels. Voxels are 3-dimensional versions of pixels which are 2-dimensional. This act of ionizing and containing voxels of ionized gas is called ion trapping and is well understood and accomplished in the art although this invention goes further than previous traps by moving them coherently inside of the apparatus.

The ionization processor is normally located at the inlet of a propulsor. There is no requirement for air to be moving when the process starts. An antennae array is identical to all the other arrays in this apparatus but assumes the function of ionization and trapping. In this example the antennae are arrayed in a circle to make it compatible with the shape of a commercial jet engine thereby allowing a replacement. However, this is not mandatory. It is only necessary for the antenna 900 to be located so that their RF emissions can be generated in concert with other antenna modules 900 to create traps. Ionization takes place in the time it takes for the air molecules to react to the high voltage ionization fields. The time domain for ionization is in trillionths of a second (picoseconds). Once ionized, the incoming cloud of air 540 is simultaneously processed by the antenna array into discrete bundles 530a-530f and by a combination of polarity switching and constructive wave aggregation in the RF fields the ionized air is conveyed away from the first antenna array to the second by digital signal switching from the control system described in FIG. 8. The ion traps which are used to create and maintain the bundles of ions 530a-530f can switch polarity. Since, the ion bundles are contained inside a trap with neutral polarity the process for transferring them from one array to the other is to repel the ions in one array and attract them in the next by polarity switching. Since, we are using RF energy to do this and RF is constantly switching polarity we can transfer by changing the phase of adjacent traps in their respective arrays and the ions will move to a new array. This process of transferring ion bundle (voxels) between antenna arrays is by preprogrammed signals not only designed to transfer the voxels along the propulsor axis but also to trap and maintain ionization by constructive and destructive waveform manipulation well understood in the art. As the ionized air exits the propulsor it is deionized when it reaches ambient air. By this time, it can be moving at speeds not encumbered by mechanical means such as a turbine. With digital signal processing with one or more digital signal processors (DSPs), the ions can be caused to flow at speeds heretofore unheard of including very high supersonic speeds, hypersonic, escape from Earth velocities and even relativistic speeds approaching the speed of light. Also, by manipulating the 3-Dimensional but thin plane of ionized voxels differentially, the exhaust of the electric ionic propulsor can have a differential exhaust which achieve vectored thrust. Vectored thrust is achieved in conventional jet engines by deflecting the flow by mechanical means such as movable nozzles. The electric ionic propulsor described here does so with software by biasing one side of the antenna array in a way to create differential flow.

Figure 10:
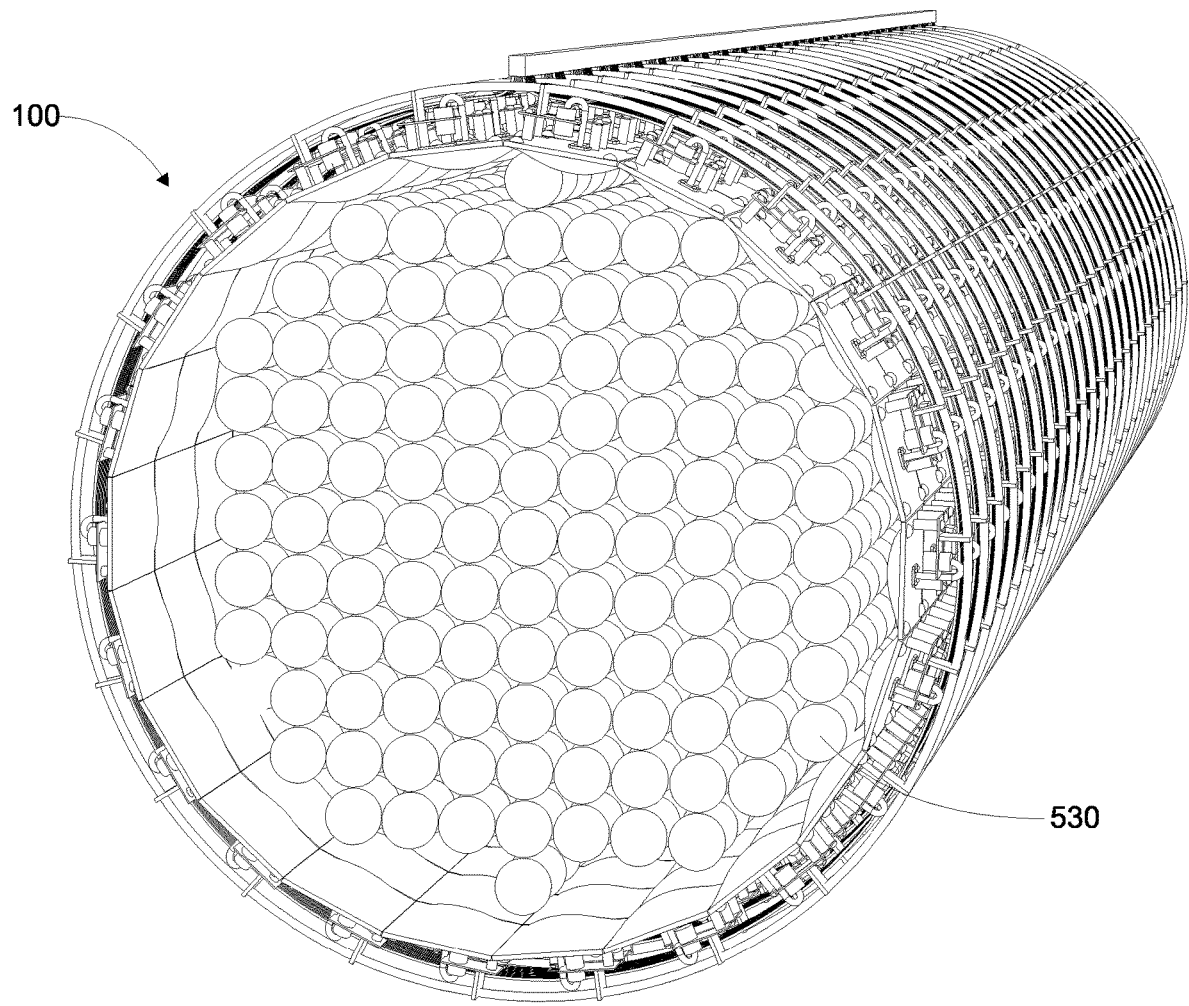
FIG. 10 is an end view of an electric ion propulsor showing ion bundles arrayed in a rank-and-file configuration.

FIG. 10 shows the electric ionic engine 100 from the end. The ionized voxels or bundles 530 are represented here by spherical structures. The size, shape and location of these structures will vary by function of the propulsor. Here they are shown all the same size and arranged by way of example in a very organized rectilinear array. Depending on the function and operation of the propulsor they may take on different shapes, sizes, number and geometric location.

Figure 11:
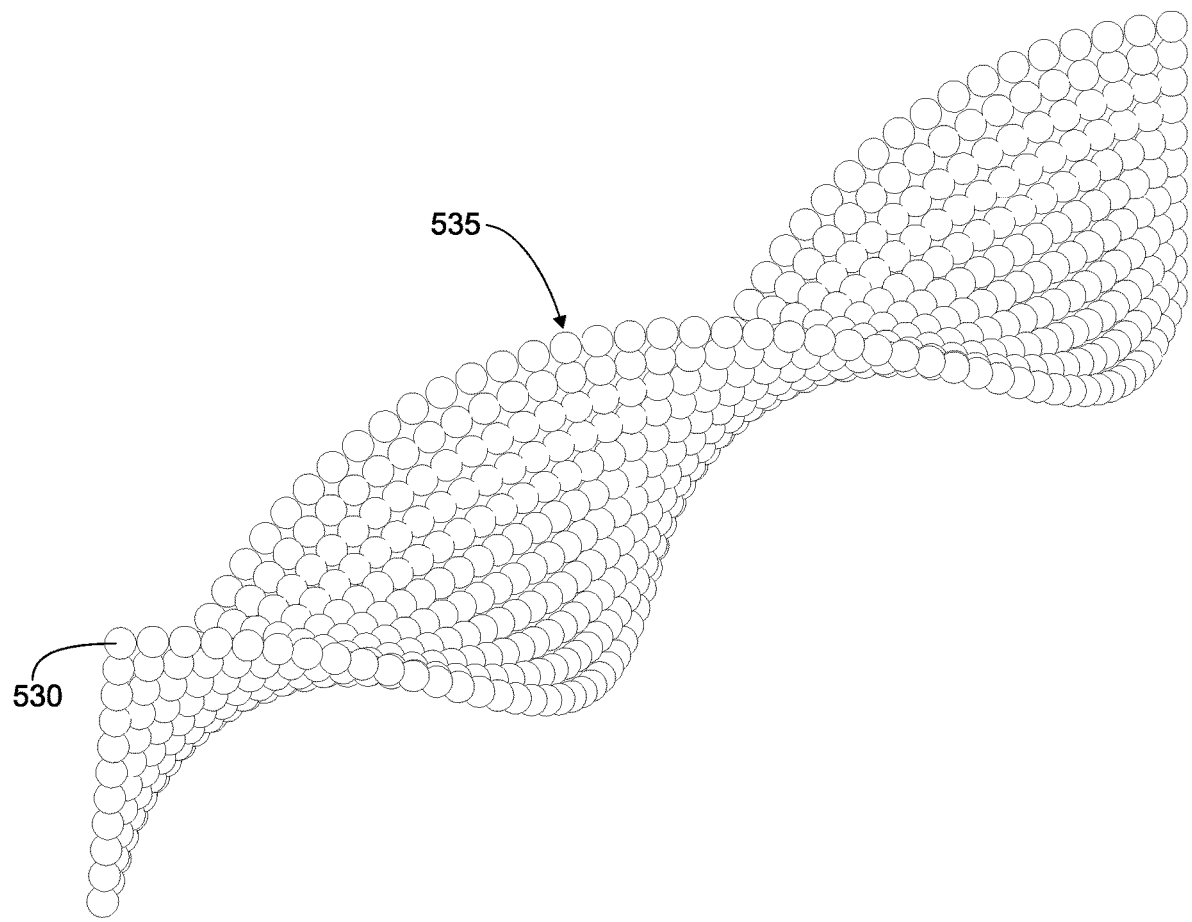
FIG. 11 is a perspective view of an electric ion propulsor showing the ion bundles arrayed in a rank-and-file configuration.

FIG. 11 shows the ionized bundles 530 as they would appear in 3-dimensions within the confines of a propulsor 100 whose shape is a cylinder. In this example the ionized bundles 530 are the same size, shape, location and arrangement from one antenna array to the next. This is not necessarily how they will look in practice. In this embodiment the air is transported through the propulsor as a unified body.

Figure 12:
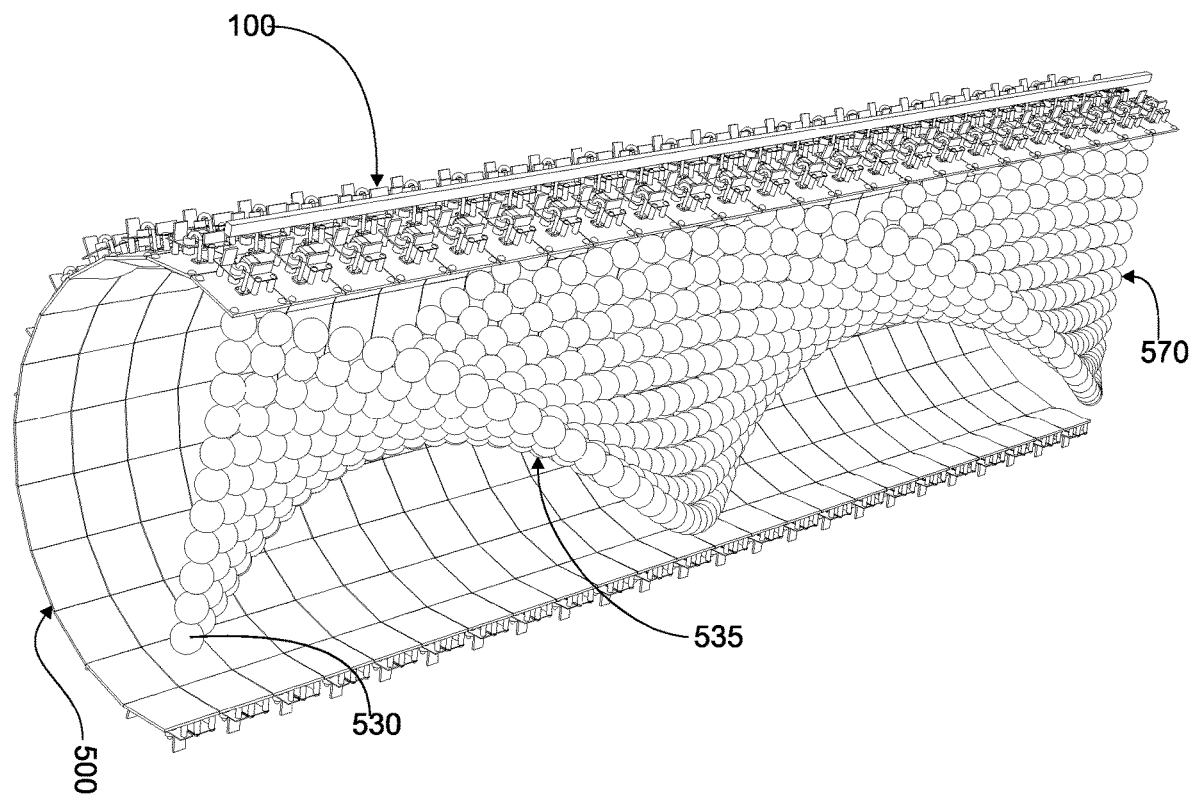
FIG. 12 is a perspective view of ion bundles arrayed as a spiral inside the ion propulsor (not shown).

FIG. 12 shows a possible structure of ionized bundles 530 arranged statically as a spiral 535. By programming the propulsor this arrangement 535 can be maintained and rotated as a unified body thereby creating a pump. Because the ionized voxels 530 are controlled by the software there is no limit to the speed this spiral can spin.

Figure 13:
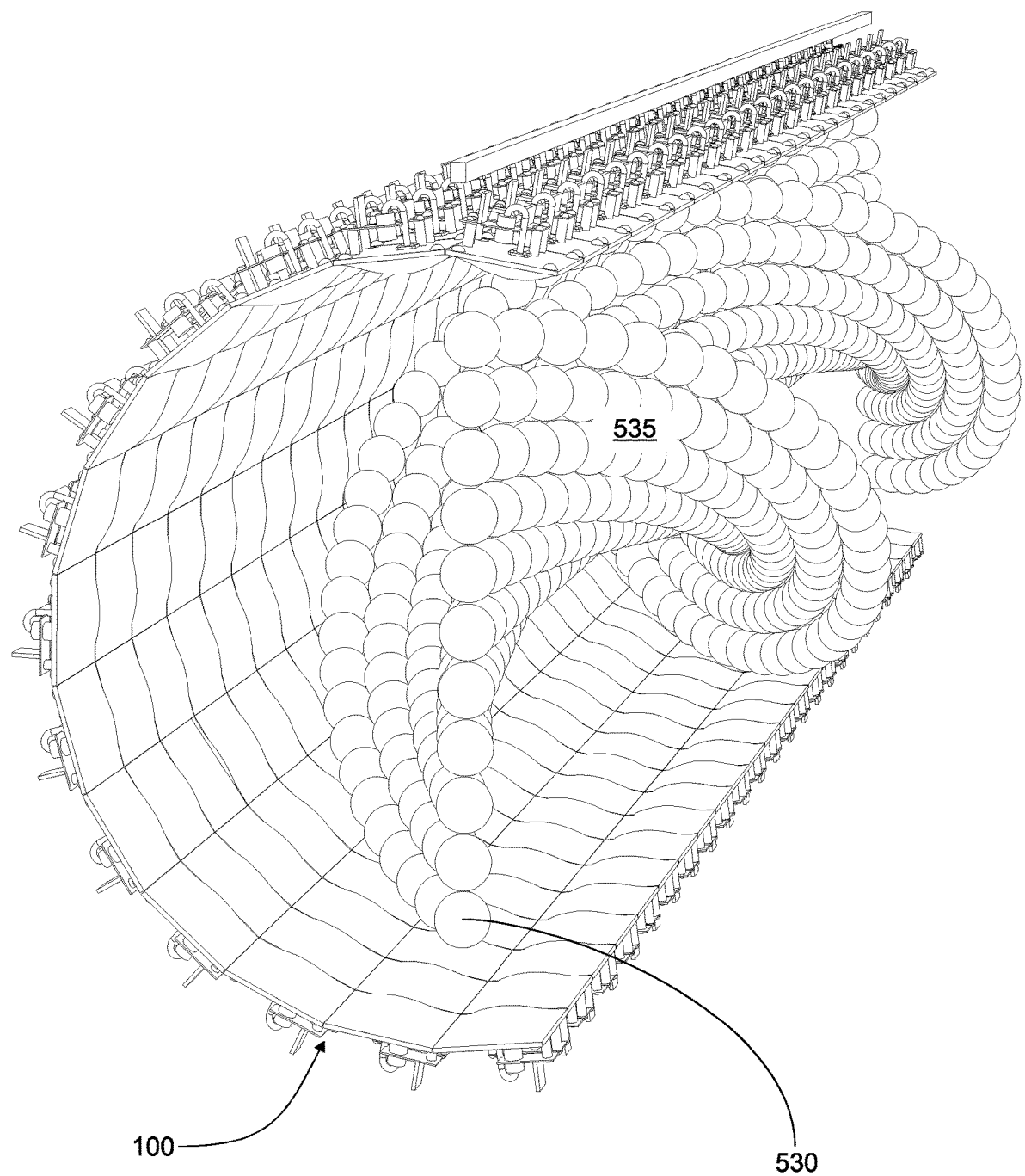
FIG. 13 is a perspective view of an electric ion propulsor with the ion bundles arrayed in a moving spiral array.
Figure 14:
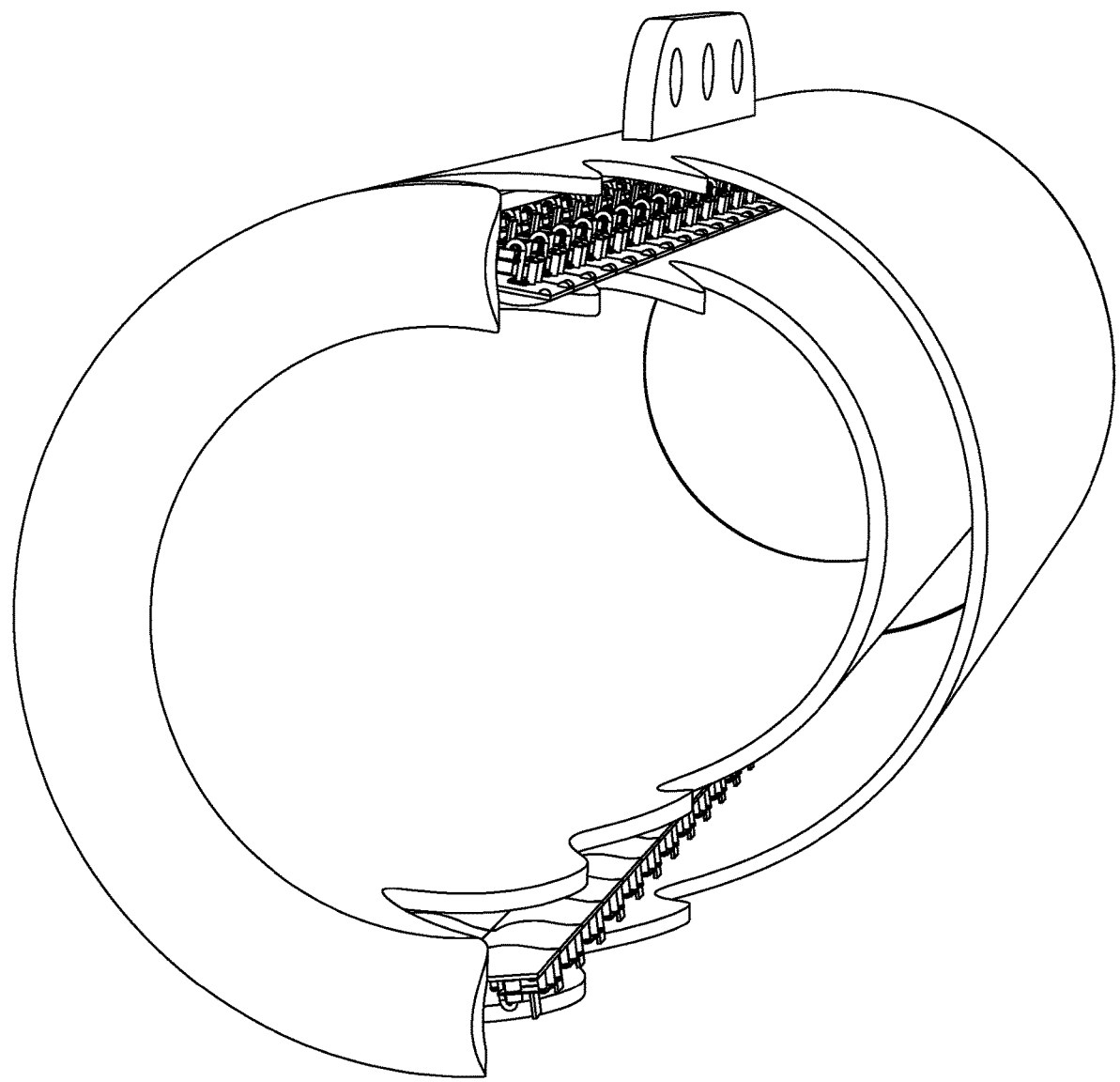
FIG. 14 is a front perspective view of an electric ion propulsor with an outer and inner casing.

FIG. 13 shows the spiral 535 as it would be constructed inside the propulsor. Whatever gases are present in this structure would be influenced by the motion of this structure. The spiral 535 is only an example of a possible structure. Other structures such as pistons, peristaltic forms, rods, propellors or solid bodies can be formed by the RF ion traps generated by the software as described in FIG. 8.

Near Field Wave Mechanics can generate points, lines, sheets, or volumes of RF energy, fixed in space, and with no breakdown level field strengths at or near any antennas or other devices that can be damaged. Thus, compared to the electrostatics solution, where a potential plasma may touch both Cathode and Anode, the NFWM solution has a free-floating region of high voltage corona or plasma, which does not touch any propulsor wall or component. Note, that voltages can easily be controlled to potentials less than plasma (breakdown) energy, as well as electric field values well beyond the plasma potential, to nearly any locations specified within the cylinder, simultaneously. The high voltage region can be visualized as a free-floating sphere or disk (or plate) that can be moved or rotated at will and does not touch any single antenna. Thus, no conductive high voltage or plasma arc is formed that can short out the system.

The Near Field Wave Mechanics principle and technology gives us a revolutionary means to (1) efficiently produce highly dense electron/ions emissions in free space, and to (2) position and control their location via intense localized RF fields. In air, the breakdown voltage to generate plasma is approximately 3 million volts per meter, or approximately 70,000 volts per inch. Thus, it is possible to (1) produce and (2) position a highly dense, high voltage electric field (corona) or plasma, in free space, without the use of a cathode or anode, and can also position this high voltage region anywhere within the cylinder (example: at the entrance). Additionally, the collection of ions can be positioned to virtually any shape desired, and then accelerated at almost limitless speeds. Finally, we can also couple this technology with conventional Ionic wind electrostatic technology for additional degrees of freedom to drive electrons and ions and accelerate ionized air [molecules] to the exit, at extremely high velocities. The NFWM technology could also form high voltage or plasma rotors or propellers, rotating at near light speeds. Rotation rates are equivalent to DSP processor speeds, with changing (stored) weight values associated with the spatial processing algorithms. Note, these weights are pre-computed, and no processing is used in real time to compute digital weights. The summation and combination of technologies generates multiple options for accelerating air molecules within the ionic propulsor as well as to generate higher thrust.

FIG. 15 shows an array of antenna 900 placed in a row under a surface 595 that is transparent to radio waves Incoming air is shown at 511. Each antenna emits a radiation pattern shown as concentric arcs. Where the arcs intersect 590 are areas of constructive interference. Since the voltage of this example is set at near breakdown voltage for in this case nitrogen a major constituent of air, the ions are trapped and remain trapped until there is a change in charge. The ion bundles 530 are transferred from one trap to the other by switching polarity (charge) which takes the negatively charged ions and repels them from negatively charged waves to positively charged waves. In this linear example ion bundles 530a-530f move from left to right.

If this array of antennae 900 are arranged on a flat plane the ion bundles are free to move in any direction parallel to the plane. Since, nitrogen makes up the majority of the mass of for example air the amount of thrust created is proportional to the speed at which the ion bundles are moving. The formula for thrust is ½ RHO*Velocity^2. Where RHO is the density of air. Although, a large volume of air would be desirable, it's the velocity of the air that contributes the most to thrust. The same amount of air moving at 100 meters per second creates 4 times as much thrust at the same amount of air moving at 50 meters per second.

The amount of air moved across the surface is a function of the number of antennae and the amount of space available for antennae. Once the air leaves the array of antennae they deionize 580 and become indistinguishable from ambient air.

Figure 16:
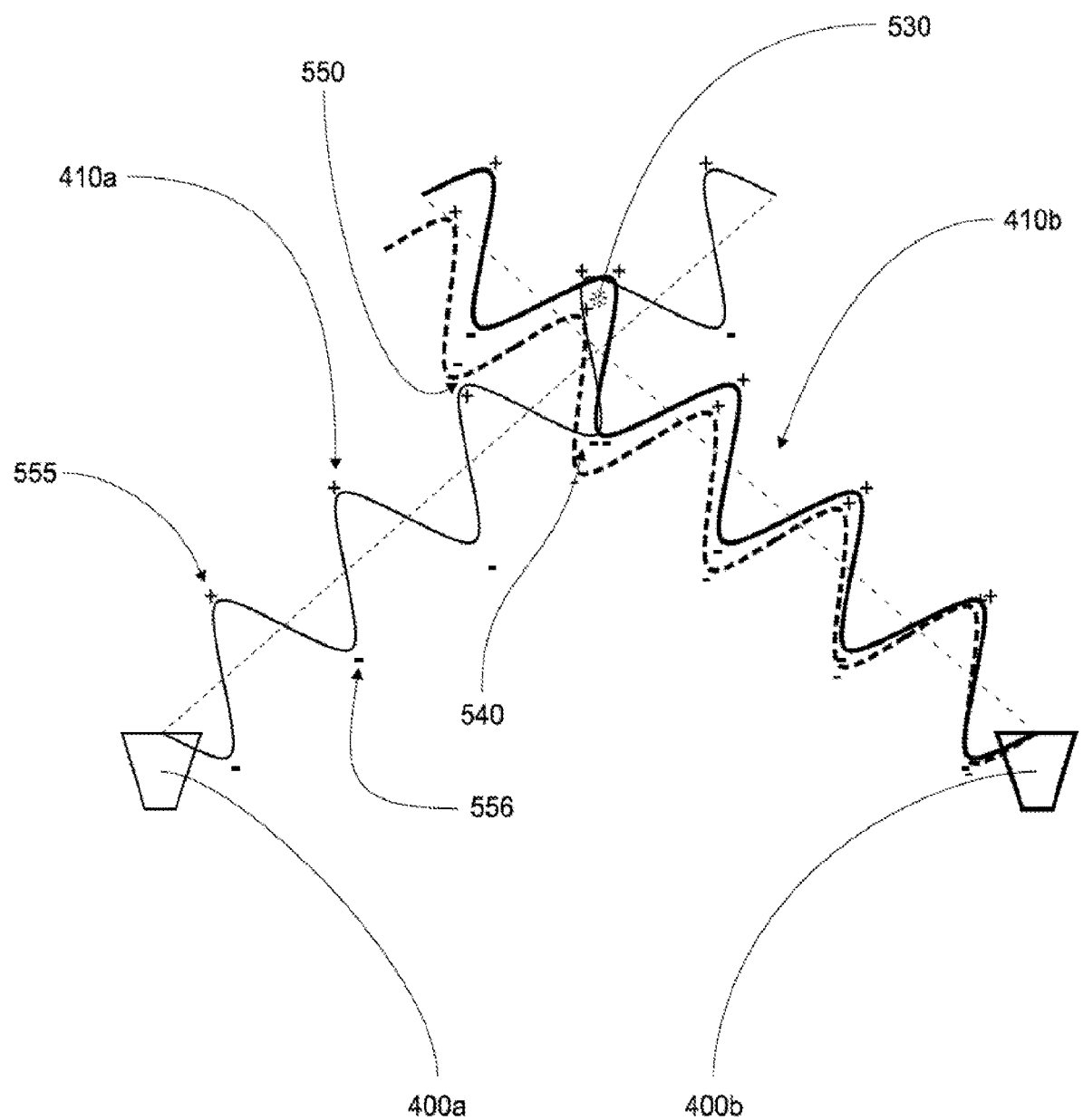
FIG. 16 shows wave manipulation causing constructive interference and trapping and containing ions in voxels or bundles.

FIG. 16 shows a cross sectional view of two antennae 400a with wave 410a and 400b with wave 410b positioned adjacent to each other and emitting waves in an upward direction have wave propagation that is spherical from each antenna. In the absence of collimating devices waves propagate radially away from each antenna. In 2-dimensions this is depicted as arc representing high and low (+/−) waves and spherical surfaces in 3-dimensions. Therefore, the waves of adjacent antenna converge. RF waves oscillate between positive and negative charge as shown by a plus sign 555 for positive and 556 for negative parts of each wave. When two positive portions of a wave from antenna 400a is in the same physical location and time as a positive wave from antenna 400b the resultant wave is a sum of the two waves and forms an area of constructive interference or ion bundle 530. Since this invention has already ionized the air molecules that area will be extra energetic and becomes a candidate for trapping those ions. In 3-dimensions waves coming from other pairs of antennae interact with those of this pair of antennae forming a 3-dimensional trap containing 3-dimensional ion bundles.

Figure 17:
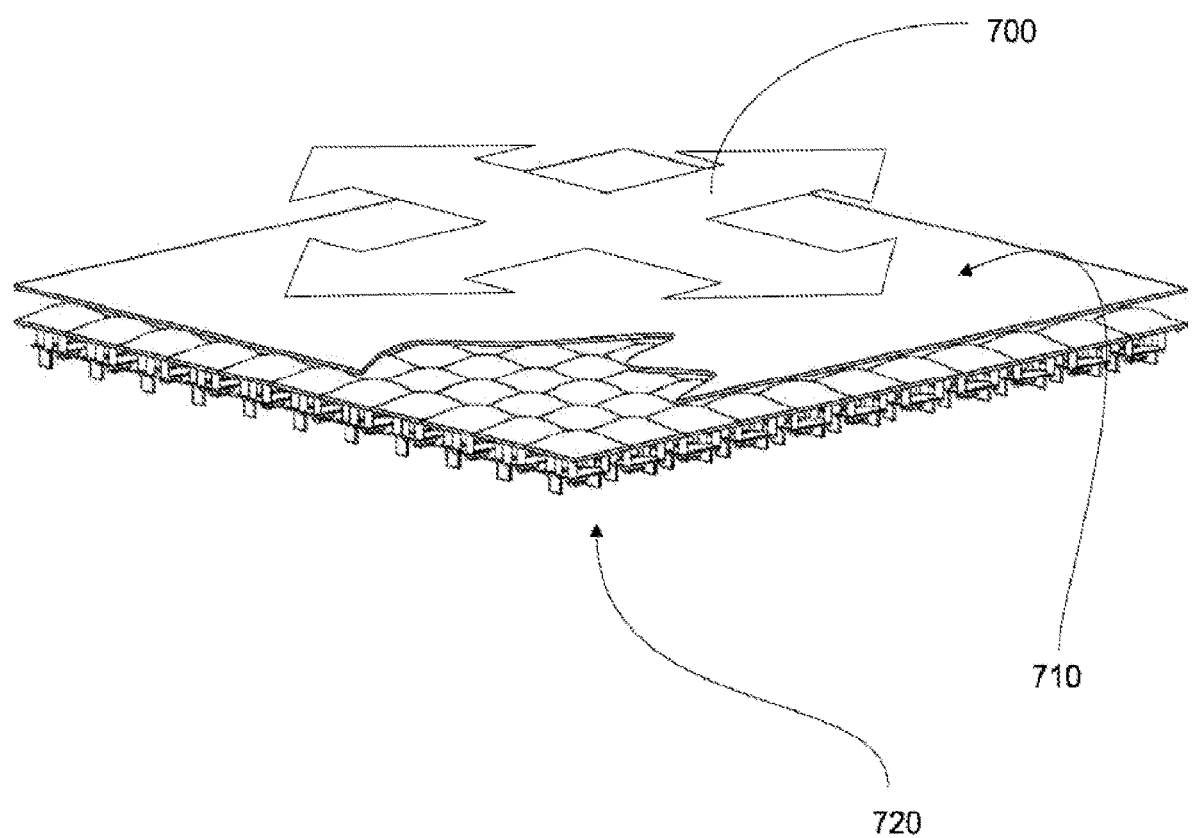
FIG. 17 shows a planar substrate embodiment where voxels can be translated in any direction.

FIG. 17 shows an example of how an array of antennae arranged in a 2-dimensional pattern 720 can via constructive interference trap ions over a surface 710 and move them in any direction 700. The same method as shown in FIG. 15 applies only instead of transporting the ion bundles in one-direction only this embodiment allows them to be moved in any direction.

The antennae can be located under a wing skin or fuselage skin or any body requiring motion in air. If this version is inverted so that the antennae are facing a surface such as the ground the air can be drawn inward opposite the arrows as show and the area under this array would be pressurized resulting in a force upward. For hovercraft this would take the place of pumps.

There is another area of higher energy when combining waves of common polarity namely negative charge also form as in area 540. Areas or volumes where a positive and negative charge are conjoined are areas of destructive interference 550. Area 550 is not created by a different wave. The dashed wave is the same wave as the solid one just radially further away.

The skilled person will understand still further that the elements described in enabling detail in embodiments and implementations above may be combined in a variety of ways in different variations of the invention, all within the breadth of the invention. The invention is limited only by the scope of the claims.

What is claimed is:

1. An electric ion propulsor, comprising:
a substrate having an inner surface and outer surface;
a plurality of antennae mounted adjacent to each other on the inner surface and are enabled to transmit RF energy; and
a controller having a connection to each of the plurality of antennae, a digital signal processor (DSP) and software stored in memory enabling control of transmission of the RF energy by each of the plurality of antennae;
wherein the software functions to control the DSP which sends signals to the plurality of antennae that controls the RF energy emitted by each of the plurality of antennae, the antennae are subdivided into a plurality of arrays, a first array of the plurality of arrays serves to ionize ambient air and trap the resulting ionized air into a plurality of individual voxels and each voxel is transferred to another adjacent array, subsequently and in a linear direction, until the voxel exits the substrate at a speed enabling air movement causing thrust.

2. The propulsor of claim 1, wherein the RF energy transmitted is at least 70 kV/m.

3. The propulsor of claim 1, wherein the DSP controls RF energy output of the plurality of antennae causing wave interference by partial construction and destruction of RF energy waves enabling the traps thereby creating and maintaining the voxels.

4. The propulsor of claim 1 wherein the signals are stored and accessed from the memory.

5. The electric ion propulsor in accordance with claim 1, wherein mounting the antenna array and anchoring the propulsor comprises a structural cylinder.

6. The propulsor of claim 1 wherein the substrate is formed as a cylinder, the inner surface is within the cylinder and the plurality of antenna are mounted adjacent to each other.

7. The propulsor of claim 6, wherein the voxels translate at the speed along a center axis of the cylinder thereby creating an air intake and opposing output thrust.

8. A method of creating thrust by translating ionized air, comprising the steps of:
- attaching a plurality of individual antenna modules to a substrate having an inner surface and an outer surface;
- connecting each one of the plurality of antennae modules to a controller including a digital signal processor (DSP) and software stored in memory enabling control of transmission of the RF energy by each one of the plurality of antennae modules;
- subdividing, by the controller, the plurality of antennae modules into a plurality of arrays;
- ionizing and trapping ambient air into a plurality of voxels by a first array; and
- translating the voxels from the first array to an adjacent array and subsequently to other arrays that are adjacent to each other in a linear direction at a speed enabling air movement causing thrust.

9. The method of claim 8, wherein the RF energy transmitted is at least 70 kV/m.

10. The method of claim 8, wherein the DSP controls RF energy output of the plurality of antennae causing wave interference by partial construction causing interference between RF energy waves enabling the traps thereby creating and maintaining the voxels.

11. The method of claim 8 wherein the signals are stored and accessed from the memory.

12. The method of claim 8, wherein mounting the antenna array and anchoring the propulsor comprises a structural cylinder.

13. The method of claim 8, wherein the substrate is formed as a cylinder, the inner surface is within the cylinder and the plurality of antenna are mounted adjacent to each other.

14. The method of claim 13, wherein the voxels translate at the speed along a center axis of the cylinder thereby creating an air intake and opposing output thrust.

* * * * *